United States Patent
Yamamoto et al.

[11] 3,889,124
[45] June 10, 1975

[54] STANDARD LIGHT SOURCE UTILIZING SPONTANEOUS RADIATION

[75] Inventors: Osamu Yamamoto, Hirakata; Mutsuo Takenaga, Katano; Yoshinobu Tsujimoto, Kashihara, all of Japan

[73] Assignee: Matsushita Electric Industrial Co., Ltd., Osaka, Japan

[22] Filed: June 21, 1973

[21] Appl. No.: 372,306

[30] Foreign Application Priority Data
June 26, 1972 Japan.............................. 47-64363

[52] U.S. Cl............ 250/493; 252/301.1 L; 250/462
[51] Int. Cl. ............................................. G21h 3/02
[58] Field of Search .......... 250/252, 458, 462, 463, 250/493; 252/301.1 R, 301.1 L

[56] References Cited
UNITED STATES PATENTS
3,701,900  10/1972  Thuler.............................. 250/71 R

*Primary Examiner*—James W. Lawrence
*Assistant Examiner*—Davis L. Willis
*Attorney, Agent, or Firm*—Stevens, Davis, Miller & Mosher

[57] ABSTRACT

A standard light source utilizing spontaneous radiation made by mixing a fluorescent substance $LnVO_4$:X (wherein Ln is Y or Gd, and X is Dy or Eu) with a radioactive substance containing a radioactive isotope which is less in the degree of temperature variation of the intensity of emitted light and excellent in stability. Particularly when used in a light-receiving device having photomultiplier tubes, the said light source emits light quite similar to that of a thermoluminescent substance such as $CaSO_4$:X (wherein X is Im, Dy, Sm or Mn), LiF or $Mg_2SiO_4$:Tb, and is excellent as a calibration high-stability standard light source for use in the above-mentioned light-receiving device.

4 Claims, 4 Drawing Figures

STANDARD LIGHT SOURCE UTILIZING SPONTANEOUS RADIATION

This invention relates to a standard light source utilizing spontaneous radiation of light for calibrating the light sensitivity of a light-receiving device. More particularly, the invention pertains to a spontaneous radiation standard light source emitting no thermoluminescence which is used in a light-receiving device using a thermoluminescent substance as the luminous body and photomultiplier tubes as the light detectors.

That is, the present invention aims to provide a spontaneous radiation standard light source for calibrating the light sensitivity of a light-receiving device which is prepared by mixing a fluorescent substance $LnVO_4:X$ (wherein Ln is Y or Gd, and X is Dy or Eu) with a radioactive substance containing a radioactive isotope.

As a device using a thermoluminescent substance as the luminous body and a light-receiving device (light detector) having photomultiplier tubes, there is a thermoluminescence dosimetry system. This system is used to measure the amount of exposure of radiation. That is, the said system consists of a measuring device and a radiation receiving element, and has utilized the principle that a fluorescent substance, which has been exposed to ionizing radiation, emits a light on heating.

In this case, a fluorescent substance emitting light, which is proportional over a wide range to the amount of exposure, is used, and the integral value of the total amount of emitted light is measured to know the dose of radiation. As such device, there is one in which are used photomultiplier tubes as the light detectors for thermoluminescent substance and $CaSO_4:Tm$ as the thermoluminescent substance. As a standard light source for calibration of a thermoluminescence dosimetry system using the said thermoluminescent substance, i.e. for calibration of photomultiplier tubes, a spontaneous radiation substance such as $Zn_2SiO_4:Mn$ or the like has been used hitherto. This spontaneous radiation substance, however, not only varies greatly in the amount of emitted light due to variation of temperature and to lapse of time, but also has thermoluminescence. In most cases, therefore, the said substance has been great in temperature variation of the intensity of emitted light and unstable in operation. Further, in order to remove the thermoluminescence, the said substance is required to be used after once elevating the temperature thereof to several hundred degrees, and thus has been undesirable for practical use.

An object of the present invention is to provide a standard light source composed of a spontaneous radiation substance showing no thermoluminescence.

Another object of the invention is to provide a standard light source utilizing spontaneous radiation of light less in variation of the intensity of emitted light with temperature.

A further object of the invention is to provide a standard light source high in stability, i.e. less in variation with time.

A still further object of the invention is to provide a standard light source capable of being easily produced.

The spontaneous radiation standard light sources according to the present invention are lower in temperature variation of the intensity of emitted lights and high in stability, and hence are effectively used as light sources for calibration of light detectors.

Other objects, features and advantages of the present invention will become apparent from the following detailed description when taken in conjunction with the accompanying drawings in which.

Figure 3:
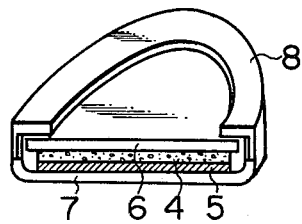
Figure 4:
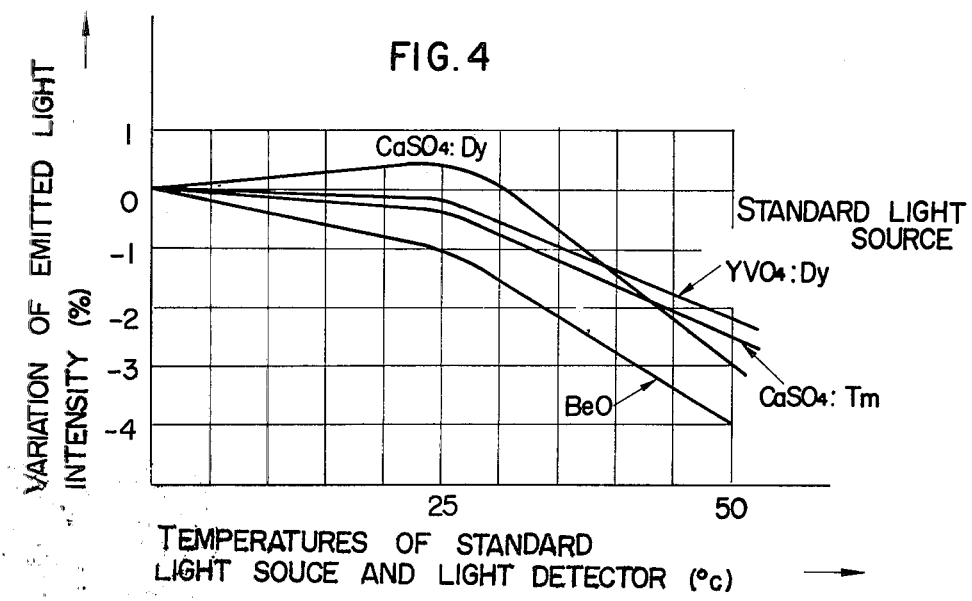

FIG. 3 is a partial cross-sectional view of a practical constitutive example of the spontaneous radiation standard light sources of the present invention; and FIG. 4 is a graph of characteristic curves which shows the variation of the intensity of light from, $YVO_4:D_y$ as an embodiment of the spontaneous radiation standard light source of the present invention when the temperature of the light detector and the light source is changed, and in which the curves of the intensity changes of thermoluminescence from thermoluminescent substances such as $CaSO_4:Tm$, $CaSO_4:Dy$ and $BeO$ are shown when the temperature of the light detector is changed similarly.

The spontaneous radiation standard light source according to the present invention is produced by use of a spontaneous radiation substance such as $YVO_4:Dy$ or $YVO_4:Eu$ which has been incorporated with a radioactive isotope, e.g. $^{14}C$. When Dy is used as the luminescent center, the said substance emits light having peaks in the vicinity of 570 nm. and 480 nm., while when Eu is used as the luminescence center, the said substance emits light having a peak in the vicinity of 620 nm. In the case where Dy was used, the ratio in height of the peak at 570 nm. to the peak at 480 nm. was about 3:1. The above-mentioned state does not substantially vary even when $GdVO_4$ is used as the body of fluorescent substance.

Generally, a calibrating standard light source for light-receiving devices using photomultiplier tubes and thermoluminescent substances is required to have such characteristics as mentioned below.

i. The light source itself should not show any thermoluminescence.
ii. The light source should be low in variation of intensity of emitted light.
iii. The light source should be high in stability (low in variation with time).

Figure 1:
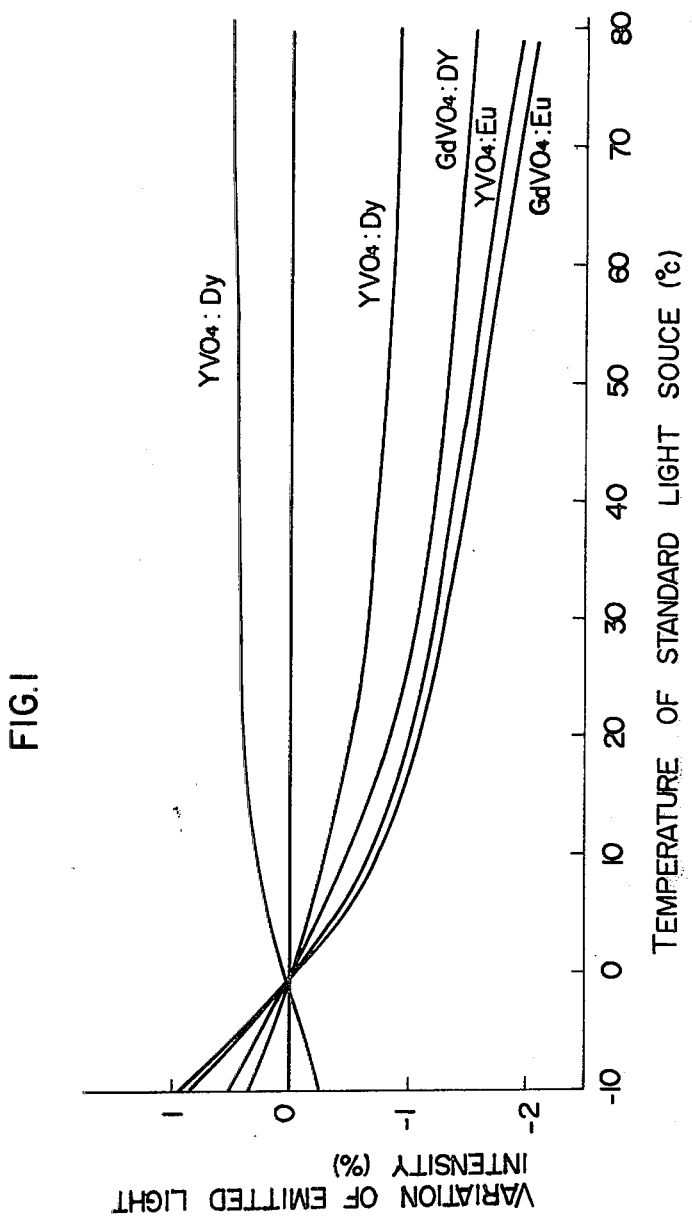
FIG. 1 is a graph of characteristic curves showing the relation between the temperatures, and the variation of the intensity of light emitted from, the spontaneous radiation standard light sources of the present invention.

It has been found that all the aforesaid substances have characteristics satisfying the above-mentioned requirements. FIG. 1 shows the variations with temperatures in intensity of lights emitted from $^{14}C$-activated $YVO_4:Eu$, $YVO_4:Dy$, $GdVO_4:Eu$ and $GdVO_4:Dy$, which variations are in the range of ±2% when the temperature is varied from −10°C to 75°C. According to FIG. 1, the variation of the intensity of light emitted from $YVO_4:Dy$ has a distribution over the range centered at zero. This is ascribable to the fact that, although the emission intensity ordinarily decreases with increasing temperature, the emission intensity in the above case is overlapped with thermoluminescence which is present in a slight amount, with the result that the temperature coefficient varies from positive to negative depending on the mixing ratio of $Dy_4$ to $YVD_4$.

From FIG. 1, it is understood that so far as a fluorescent substance shows such an amount of variation of the intensity of emitted light as seen in FIG. 1, the said substance is sufficiently usable as a calibrating standard light source. That is, the substances shown in FIG. 1 satisfy the aforesaid conditions (i) and (ii). Further, these substances are stable in luminescence, and show a slight variation with time as about 2% when accommodated in proper capsules. Thus, the said substances satisfy the aforesaid condition (iii) as well.

Construction and process for production of the spontaneous radiation standard light source according to the present invention are explained below.

Figure 2:
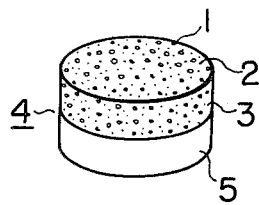
FIG. 2 is a slant view of an embodiment of the spontaneous radiation standard light sources of the present invention.

In FIG. 2, 1 is a fluorescent substance LnVO$_4$:X (wherein Ln is Y or Gd, and X is Dy or Eu) which is less in temperature dependency. This fluorescent substance is prepared in the following manner:

A mixture comprising 5.516 g of $Y_2O_3$, 4.456 g of $V_2O_5$ and 0.027 g of $Dy_2O_3$ is calcined in air at 1,100°C for 6 to 10 hours. Subsequently, the calcined mixture is pulverized, stirred and again calcined in air at 1,250°C. for 8 to 10 hours to prepare the fluorescent substance. The same procedure as above is adopted also in the case where $Gd_2O_3$ is used in place of the $Y_2O_3$ and $Eu_2O_3$ is used in place of the $Dy_2O_3$.

The numeral 2 in FIG. 2 shows a radioactive substance which emits definite radiation, and is a powder of a $^{14}C$-containing compound, e.g. Ba $^{14}CO_3$, a $^{90}Sr$-containing compound, e.g. $^{90}SrTiO_3$, or a $^{241}Am$-containing compound, e.g. $^{241}Am_2O_3$. As the said radioactive substance, there may be used any substance so far as it can emit $\beta$-rays, $\alpha$-rays or $\gamma$-rays, and is long in half-value period of radioactivity. The radioactive substance is used in such an amount as not to have any influence on the human body.

The above-mentioned fluorescent substance 1 and radioactive substance 2 are formed into a solid article by use of a binder 3. The binder 3 is required to be transparent and stable to heat and the like, and may be silicon resin or water glass.

The numeral 4 shows the solid article formed from the above-mentioned fluorescent substance 1, radioactive substance 2 and binder 3. The solid article 4 is a spontaneous radiation solid prepared by pulverizing to 5 to 10 microns a mixture comprising several milligrams, of the fluorescent substance 1 prepared in the aforesaid manner and one-several tenth to several hundredth of the amount thereof of the radioactive substance, and thoroughly kneading to solidify the pulverized mixture with the binder 3 in an amount equal to or one-half weight of said fluorescent substance 1. Thereafter, the solid article 4, which forms a luminescence portion, is firmly adhered to a base plate 5 to prepare a luminescent element. As the base plate 5, a plate which is difficult to be deformed and high in mechanical strength is preferable, and a stainless steel plate or the like is used.

The construction of the thus prepared luminescent element is as shown in FIG. 2. The diameter of the luminescent element is about 1 to about 5 mm, the thickness of the solid article 4 is about 0.5 mm, and the thickness of the base plate is 0.5 to 1 mm.

FIG. 3 shows a practical constitutive example of the standard light source using the above-mentioned luminescent element. In FIG. 3, 6 is a glass plate which covers the surface of the above-mentioned solid article 4. The glass plate 6 not only permits visible rays and ultraviolet rays but also is high in mechanical strength and excellent in effect of protecting the radioactive substance 2. Further, the glass plate 6 desirably has a flat and smooth surface so as to be easily free from dust, and the thickness thereof is sufficingly at least 0.5 mm. The numeral 7 shows a substrate on which the above-mentioned base plate is placed. The substrate 7 is made of a metal or a resin. The numeral 8 shows an outer casing which externally covers the peripheries of said luminescent element, glass plate 6 and substrate 7. The outer casing is attached by means of screws or a resin.

An example, in which the YVO$_4$:Dy prepared in the above-mentioned manner is used as a calibrating standard light source, is shown below.

The YVD$_4$:Dy, which has been incorporated with the radioactive substance, has its emission peaks at wave lengths in the vicinity of 570 nm and 480 nm as mentioned previously. Thermoluminescent substances have their emission peaks at such wave lengths that CaSO$_4$:Tm at 452 nm, CaSO$_4$:Dy at 571 nm and 478 nm, CaSO$_4$:Sm at 593 nm, CaSO$_4$:Mn at 500 nm, LiF at 400 nm and Mg$_2$SiO$_4$:Tb at 490 nm. The aforesaid YVO$_4$:Dy is quite similar in emission peak to each of the above-mentioned thermoluminescent substances, and is particularly excellent for the calibration of a thermoluminescence dosimetry system, in which the said CaSO$_4$:Tm is used as the thermoluminescent substance. That is, a photomultiplier tube, which is used as the light detector in the above-mentioned system and which receives the light from the thermoluminescent substance CaSO$_4$:Tm, has a high sensitivity to light having wave lengths in the range from 400 to 500 nm. Accordingly, the aforesaid YVO$_4$:Dy, which has a spectral sensitivity in the above-mentioned range, is quite suitable as a calibration standard light source of photomultiplier tubes.

FIG. 4 is a graph of characteristic curves showing the intensity variation of emission from calibrating light source YVO$_4$:Dy with temperature of fluorescent substance and light detector is varied simultaneously and from thermoluminescent substances CaSO$_4$:Tm, CaSO$_4$:Dy and BeO, with temperature of light detector is varied.

As is clear from FIG. 4, the thermoluminescent substances, particularly CaSO$_4$:Tm, are quite similar in temperature variation of intensity of emitted light to the calibration light source YVO$_4$:Dy, and when the former is calibrated by the latter, an extremely flat temperature characteristic is attained to make the optimum calibration possible.

In short, the optimum conditions for the calibration light source of a light detector, which uses, for example, a thermoluminescent substance as the luminous body and which receives the light emitted therefrom, are such that it shows no thermoluminescence, is less in an amount of variation of the intensity of emitted light, less in variation with time, and, at about the calibration temperature, has a luminescence characteristic similar to that of the said thermoluminescent substance. Particularly when CaSO$_4$:Tm is used as the thermolunescent substance, the above-mentioned YVO$_4$:Dy is most preferable as the calibrating standard light source.

In addition to said YVO$_4$:Dy, all of YVO$_4$:Eu, GdVO$_4$:Dy and GdVO$_4$:Eu according to the present invention can substantially satisfy the above-mentioned conditions as well, and when these are used as calibration, high-stability standard light sources of light detectors, accurate calibration can be effected.

What we claim is:

1. A standard light source utilizing spontaneous radiation which comprises a mixture of
   a fluorescent substance $LnVO_4{:}X$ wherein Ln is selected from the group consisting of Y and Gd, and X is selected from the group consisting of Dy and Eu and,
   a radioactive substance containing a radioactive isotope.

2. A spontaneous radiation standard light source according to claim 1, wherein the radioactive substance containing a radioactive isotope is one member selected from the group consisting of $Ba^{14}CO_3$, $^{90}SrTiO_3$ and $^{241}Am_2O_3$.

3. A spontaneous radiation standard light source which comprises
   a solid article prepared from a mixture of
   a fluorescent substance $LnVO_4{:}X$ wherein Ln is selected from the group consisting of Y and Gd, and X is selected from the group consisting of Dy and Eu,
   a radioactive substance containing a radioactive isotope, and
   a binder; and
   a transparent base plate onto which the said solid article has been firmly adhered.

4. A spontaneous radiation standard light source according to claim 3, wherein the solid article comprises a glass plate placed on the surface of the solid article, a substrate supporting the transparent base plate, and an outer casing externally covering the peripheries of said solid article, substrate and glass plate.

* * * * *